United States Patent

Fechner et al.

(10) Patent No.: US 7,952,490 B2
(45) Date of Patent: May 31, 2011

(54) METHOD FOR IDENTIFYING THE ACTIVATION OF THE BRAKE LIGHTS OF PRECEDING VEHICLES

(75) Inventors: Thomas Fechner, Kressbronn (DE); Marcus Asmuth, Kösching (DE)

(73) Assignee: Continental Temic Microelectronic GmbH, Nürnberg (DE)

( * ) Notice: Subject to any disclaimer, the term of this patent is extended or adjusted under 35 U.S.C. 154(b) by 276 days.

(21) Appl. No.: 11/884,911

(22) PCT Filed: Jan. 21, 2006

(86) PCT No.: PCT/DE2006/000092
§ 371 (c)(1),
(2), (4) Date: Aug. 22, 2007

(87) PCT Pub. No.: WO2006/089498
PCT Pub. Date: Aug. 31, 2006

(65) Prior Publication Data
US 2008/0165028 A1    Jul. 10, 2008

(30) Foreign Application Priority Data

Feb. 22, 2005   (DE) .......................... 10 2005 007 946
Nov. 3, 2005    (DE) .......................... 10 2005 052 469

(51) Int. Cl.
*G08G 1/00* (2006.01)

(52) U.S. Cl. ..................................................... 340/901
(58) Field of Classification Search .................. 340/901, 340/479, 463; 250/332; 362/499
See application file for complete search history.

(56) References Cited

U.S. PATENT DOCUMENTS

| | | | |
|---|---|---|---|
| 6,314,364 B1 * | 11/2001 | Nakamura | 701/200 |
| 6,570,998 B1 | 5/2003 | Ohtsuka et al. | |
| 6,842,531 B2 | 1/2005 | Ohtsuka et al. | |
| 7,365,769 B1 * | 4/2008 | Mager | 348/113 |
| 2004/0195508 A1 * | 10/2004 | Moisel | 250/330 |
| 2005/0134479 A1 * | 6/2005 | Isaji et al. | 340/901 |

FOREIGN PATENT DOCUMENTS

| | | |
|---|---|---|
| DE | 19648826 | 6/1997 |
| DE | 19734005 | 2/1999 |
| DE | 19736584 | 2/1999 |
| DE | 10132386 | 1/2003 |
| EP | 1024050 | 8/2000 |

* cited by examiner

*Primary Examiner* — Phung Nguyen

(57) ABSTRACT

An image processing method for detecting the activation of brake lights of vehicles driving in front, which do not emit an additional or a changed modulated signal during the braking procedure, has been presented. For this purpose, an image sensor or an image sensor system is aligned to a point in front of the vehicle, the camera images are fed into a memory and a motor vehicle driving in front is identified by means of a pattern recognition method on the image; in addition, following the detection of the vehicle, image areas are determined which contain brake lights to a high degree of probability.

8 Claims, 1 Drawing Sheet

Image (t=0)      Image (t=0+80ms)

Differential image

METHOD FOR IDENTIFYING THE ACTIVATION OF THE BRAKE LIGHTS OF PRECEDING VEHICLES

BACKGROUND OF THE INVENTION

The invention relates to a method for detecting the activation of brake lights of vehicles driving in front, in which a vehicle driving in front is recorded with an image sensor, and a signal is issued when it is detected that the brake lights light up, which can be converted in a warning device and/or in a vehicle assistance system.

In patent application EP 0380 797, the detection of the tail lights of a motor vehicle is described in the infrared range with a CCD image sensor. The advantage of detection with a CCD image sensor in the infrared range is that the sensitivity of the image sensor is higher than that of the human eye in the visible red spectral range, so that reliable functioning is guaranteed with a wide range of light and weather conditions. With a recorded beam intensity above a specified threshold value, i.e. when the distance between the vehicles has not reached a critical level, a warning signal is triggered. In order to detect the activation of the brake lights, an additional infrared signal which can be modulated is provided on the vehicle driving in front, the modulation of which alters during the braking procedure. When the modulation is altered, a warning signal is also issued. The warning signals are converted in a warning device and/or a vehicle intervention.

In the publication DE 19734005, a device for reducing the brake path of motor vehicles is presented which makes use of an infrared sensor for detecting when a brake light on the vehicle driving in front lights up. In a situation which is estimated to be critical, e.g. when the brake lights are activated and there is a short distance between the vehicles, a warning signal is generated and appropriate measures are initiated, such as warning the driver, activating the brake pedal and pre-loading the brake system.

The object of the invention is to provide a method for also rapidly and cost-effectively detecting the activation of brake lights of vehicles which are driving in front which do not emit an additional or a modulated signal during the braking procedure.

SUMMARY OF THE INVENTION

This object is attained by means of a method for detecting the activation of brake lights of vehicles driving in front, whereby an image sensor or an image sensor system is aligned to a point in front of the vehicle and camera images are fed into a memory. A vehicle driving in front is identified by means of a pattern recognition method on the image, and in addition, following the detection of the vehicle, image areas are determined which contain the position of the brake lights to a high degree of probability, and a differential image is formed from two images which are recorded offset from each other in time, and when changes in brightness occur in relevant image areas, an activation of the brake lights is detected.

An image sensor or an image sensor system is provided which is aligned to a point in front of the vehicle, whereby the images are fed into a memory. The image recorded is checked for the presence of a vehicle driving in front, using a pattern recognition method. If a vehicle is identified, relevant image areas are identified according to a previously specified method, which contain to a high degree of probability the positions of the brake lights. Preferably, a differential image is created from two images which are offset from each other in time, in which images are subtracted from each other which have been recorded at a suitable distance in time which is based on the "lighting duration" of the brake light. The relevant image areas are analysed for changes in brightness which are typical for a switching-on procedure of a light. If this change in brightness is greater than a specified threshold value, an activation of the brake light of the vehicle driving in front is detected.

In a particular embodiment of the invention, with periodically recurring changes in brightness, an operation of the brake lights is preferably detected with a specified repetition frequency. In this way, flashing brake lights are clearly detected via their specified frequency or their specified frequency range. The number of images selected per time unit is adjusted to the anticipated frequency or anticipated frequency range of the flashing brake light. The value of the repetition frequency can e.g. be determined by means of a local frequency analysis or from the image data on the basis of a differential image analysis.

In a preferred embodiment of the device, an additional check is made as to whether the changes in brightness which are characterised as being relevant comprise a shape which is characteristic for brake lights, such as a circular shape, since brake lights generally emit a punctiform light beam. After a punctiform light source has been verified, an activation of the brake light is detected. In an advantageous embodiment, an additional check is made as to whether two changes in brightness occur at locations which are at the same height from the road, and which are at the same distance from the centre of the vehicle, and when the result is positive, an activation of the brake light is detected.

In an advantageous embodiment, the changes in brightness in images which succeed each other are analysed with the aim of ascertaining whether a change in the level and/or the shape of the same light source or tail light occurs with time. An enlargement of the area of a brake light which lights up can for example show an increasingly negative acceleration. If the shape and/or the size of a light source changes in a specified manner, an activation of the brake lights is detected from it, or an earlier detection is confirmed. In addition, with a specified change in shape and size of the brake light, a conclusion can be made regarding the degree of the brake intervention, and a corresponding signal is emitted.

Furthermore, an additional sensor can be provided in the vehicle, which supports the identification of a vehicle driving in front. The optional sensor can be a device for measuring the distance and/or the speed, and this measuring data is taken into account when deciding whether to issue a warning signal.

BRIEF DESCRIPTION OF THE DRAWINGS

Further advantages and special features of the invention will now be explained below with reference to an exemplary embodiment and two drawings, in which.

DETAILED DESCRIPTION OF THE DRAWINGS

Figure 1:
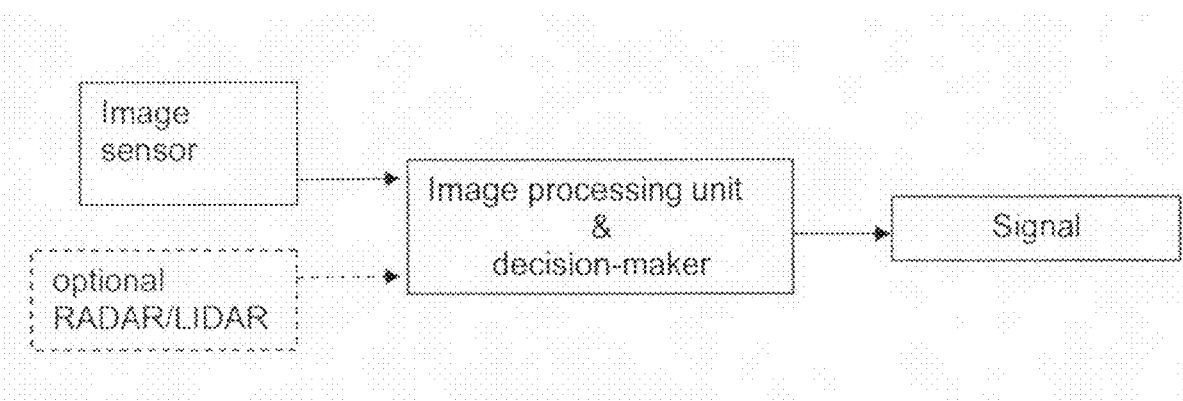
FIG. 1: shows a block diagram.

FIG. 1 explains the sequence of the method in a block diagram. First, images are recorded in series by an image sensor. Here, for example, the use of a CCD camera for recording red and/or infrared rays is advantageous. The images are stored temporarily in an image processing unit, and a vehicle driving in front is segmented in the camera image using edge extraction or other pattern recognition methods such as template matching. Here, an additional sensor can also be used as a support, which records a vehicle driving in front, the target message of which is projected into the image, and which specifies the region which contains the vehicle. This can be a radar or a lidar sensor, for example.

Figure 2:
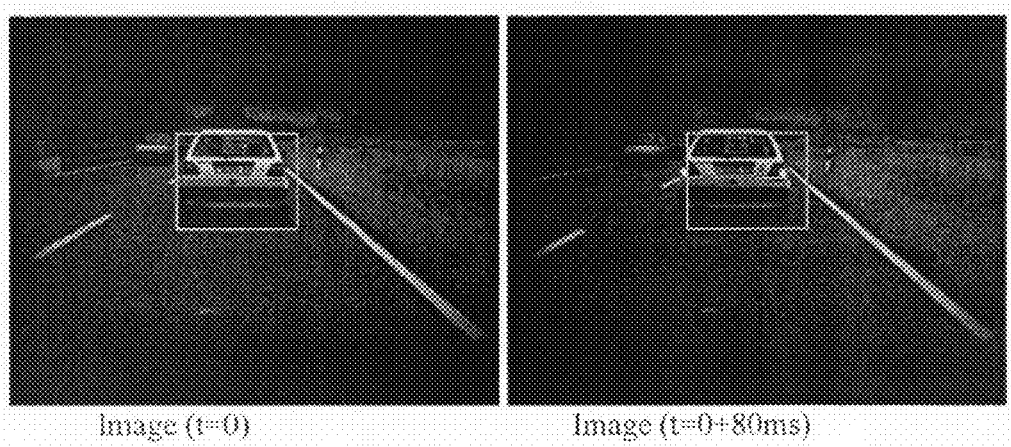
FIG. 2: shows a method for detecting the activation of brake lights of vehicles driving in front.
Figure 2:
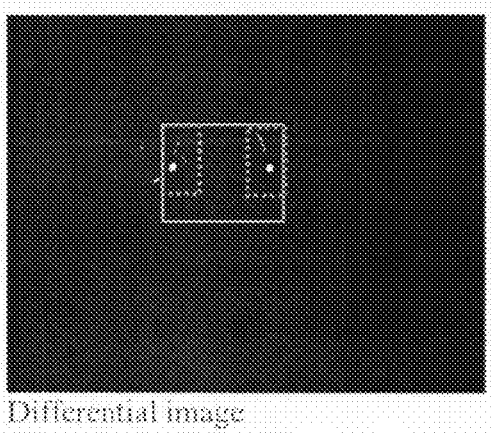

Starting from a box which surrounds the vehicle (bounding box), which is shown in the upper left hand corner of FIG. 2, two symmetrical regions are determined in which the brake lights are assumed to be present. These relevant regions are shown in the bottom left-hand corner of FIG. 2. Images are recorded in series with a time difference of 80 ms. Using a differential image analysis, in which images are subtracted from each other, which have been recorded at an appropriate distance in time based on the "lighting duration" of the brake light, a search is made for chronological, large-scale changes in brightness. The differential image is created by subtracting the last image from the current image. FIG. 2 initially shows in the upper left-hand corner a vehicle without activated brake lights; in the image which has next been recorded 80 ms later, and which is shown in the upper right-hand corner, the brake lights are by contrast visibly activated. The differential image of the two images is shown in the lower left-hand corner of FIG. 2; the two bright points can clearly be seen in the relevant image regions. A simple threshold value operation is used on the intensities of the differential image. Closely adjacent pixels of high intensity are combined to form an object. Objects are then filtered which have circular properties, e.g. on the basis of the check of the relationship between the circumference and the area. In order to secure a brake light which potentially lights up, symmetry properties are queried such as the same height above the road and the same distance to the centre of the vehicle from the brake light which is in each case positioned opposite. The result is a signal which indicates whether the brake lights of the vehicle driving in front have been activated.

The invention claimed is:

1. A method for detecting activation of brake lights of vehicles driving in front of a vehicle, whereby an image sensor or an image sensor system is aligned to a point in front of the vehicle, and camera images are fed into a memory, the method comprising:
   detecting a vehicle driving in front by using a pattern recognition method on the image;
   after detecting a vehicle, determining image areas which contain a position of brake lights to a high degree of probability; and
   forming a differential image from two images which are recorded offset from each other in time, wherein when changes in brightness occur in relevant image areas, an activation of the brake lights is detected.

2. The method of claim 1, wherein with periodically recurring changes in brightness, an activation of the brake lights is detected.

3. The method of claim 1, wherein a shape of the areas have changes in brightness is analysed and with specified shapes an activation of the brake lights is detected.

4. The method of claim 1, wherein positions of the changes in brightness is analysed, and only when the positions are located at two positions which are at the same height above a road and at a same distance from a center of the vehicle is an activation of the brake lights detected.

5. The method of claim 1, wherein with changes in brightness in images which occur in series, which are caused by at least one of a change in size or shape of a light source or tail light in time, an activation of the brake lights is detected.

6. The method of claim 1, wherein from changes in brightness in images which occur in series, which are caused by a change in size or shape of the same light source or tail light in time, a degree of brake intervention is determined.

7. The method of claim 1, wherein a lidar or radar system is provided so that identification of a vehicle driving in front is supported and a least one of information regarding a distance and a relative speed to the vehicle driving in front is taken into account when deciding whether to issue a warning signal.

8. A method for detecting activation of brake lights of vehicles driving in front of a vehicle, whereby an image sensor or an image sensor system is aligned to a point in front of the vehicle, and camera images are fed into a memory, the method comprising:
   detecting a vehicle driving in front by using a pattern recognition method on the image;
   after detecting a vehicle, determining image areas which contain a position of brake lights to a high degree of probability; and
   forming a differential image from two images which are recorded offset from each other in time, wherein with a periodically recurring changes in brightness with a specified repetition frequency, an activation of the brake lights is detected.

* * * * *